United States Patent [19]
Khazanov et al.

[11] Patent Number: 5,616,973
[45] Date of Patent: Apr. 1, 1997

[54] PUMP MOTOR HOUSING WITH IMPROVED COOLING MEANS

[75] Inventors: Yuri Khazanov, Northbrook; Wilbur D. Norwood, Chicago, both of Ill.

[73] Assignee: Yeomans Chicago Corporation, Melrose Park, Ill.

[21] Appl. No.: 267,968

[22] Filed: Jun. 29, 1994

[51] Int. Cl.⁶ .................... H02K 5/20; H02K 9/19
[52] U.S. Cl. .................... 310/54; 310/58; 310/89
[58] Field of Search .................... 310/52, 54, 58, 310/59, 60 R, 60 A, 87, 89; 417/367, 368, 423.8, 423.14

[56] References Cited

U.S. PATENT DOCUMENTS

| | | | |
|---|---|---|---|
| 2,784,672 | 3/1957 | Wallace | 310/54 |
| 2,829,286 | 4/1958 | Britz | 310/53 |
| 2,931,307 | 4/1960 | Smith | 310/87 |
| 3,060,335 | 10/1962 | Greenwald | 310/54 |
| 3,260,872 | 7/1966 | Potter | 310/54 |
| 3,371,613 | 5/1968 | Dahlgren et al. | 310/54 |
| 3,443,519 | 5/1969 | White | 417/423.8 |
| 3,525,001 | 8/1970 | Erickson | 310/54 |
| 3,653,785 | 4/1972 | Dahlgren et al. | 310/54 |
| 4,198,191 | 4/1980 | Pierce | 310/54 |
| 4,691,131 | 9/1987 | Nakano | 310/54 |
| 4,742,257 | 5/1988 | Carpenter | 310/62 |
| 4,745,314 | 5/1988 | Nakano | 310/57 |
| 4,764,699 | 8/1988 | Nold | 310/54 |
| 4,838,763 | 6/1989 | Kramer | 417/423.14 |
| 4,890,988 | 1/1990 | Kramer | 417/423.8 |
| 5,034,638 | 7/1991 | McCabria | 310/54 |
| 5,034,639 | 7/1991 | Huss | 310/60 A |
| 5,145,298 | 9/1992 | Marantette | 310/54 |
| 5,250,863 | 10/1993 | Brandt | 310/52 |

FOREIGN PATENT DOCUMENTS

| | | | |
|---|---|---|---|
| 13869 | 8/1980 | European Pat. Off. | 417/368 |
| 589187 | 3/1994 | European Pat. Off. | 310/54 |
| 1136412 | 9/1962 | Germany | 310/54 |
| 61-170254 | 7/1986 | Japan | 310/54 |
| 246323 | 1/1926 | United Kingdom | 310/58 |
| 883827 | 12/1961 | United Kingdom | 310/54 |

OTHER PUBLICATIONS

Scanpump technical brochure, "Submersible Pumps Series Z6000" May 1994.

Primary Examiner—Clayton E. LaBalle
Attorney, Agent, or Firm—Lockwood, Alex, Fitzgibbon & Cummings

[57] ABSTRACT

A motor housing for an air-filled motor incorporates a closed loop system in a cylindrical shell member of the housing which includes a plurality of coolant lift passages and coolant return passages which extend longitudinally along a sidewall of the housing. The lift and return passages communicate with an annular circulation passage at the uppermost portion of the motor housing and at their opposite ends, the passages communicate with a coolant reservoir at high and low pressure regions thereof. An impeller attached to the motor driveshaft is disposed within the fluid reservoir and provides the circulating force necessary to circulate the coolant through the closed loop system.

37 Claims, 5 Drawing Sheets

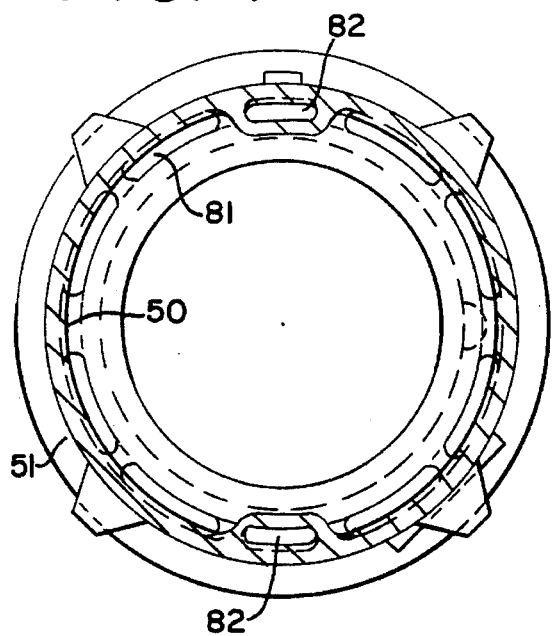
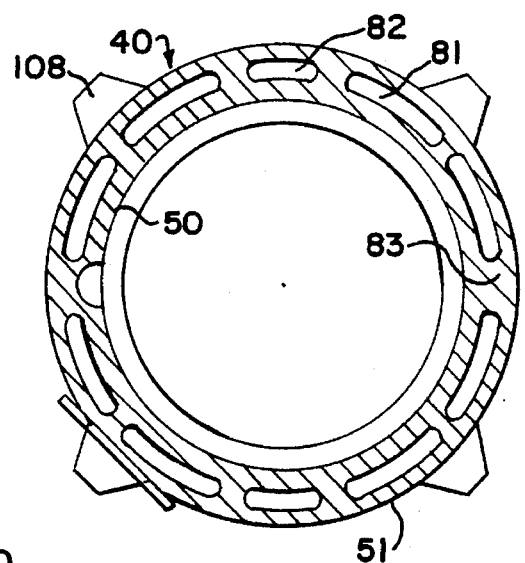
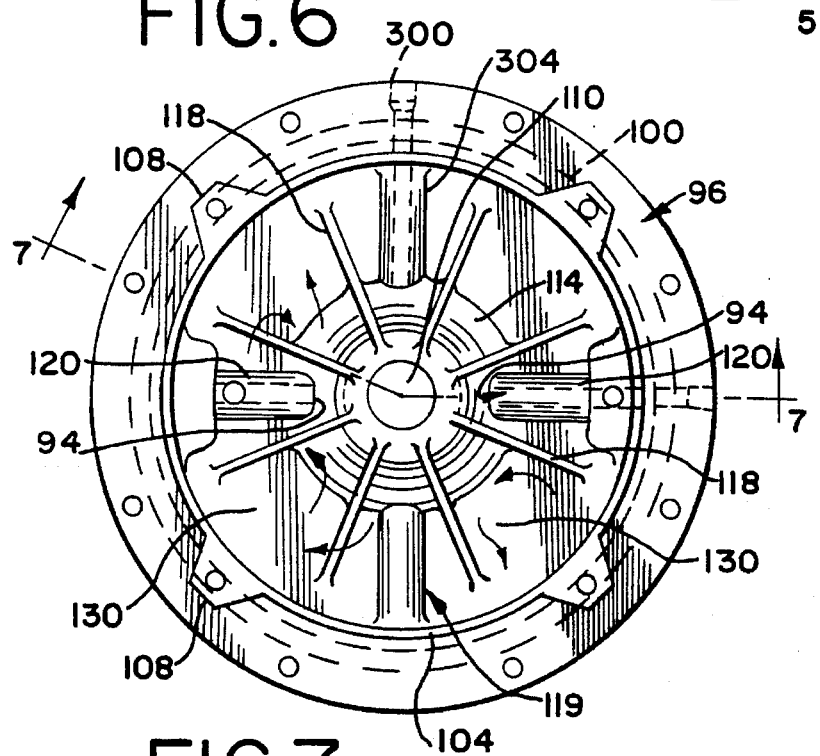
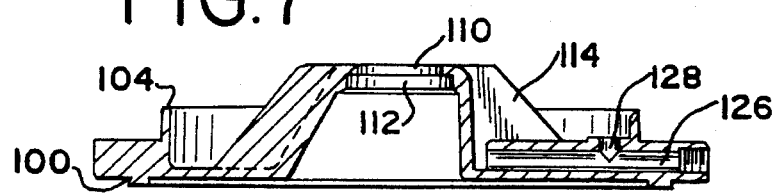

5,616,973

PUMP MOTOR HOUSING WITH IMPROVED COOLING MEANS

BACKGROUND AND SUMMARY OF THE INVENTION

The present invention is generally directed to motor housings, and more specifically is directed to a pump motor housing having an improved cooling means for cooling the motor.

The present invention finds particular utility in the areas of water and wastewater treatment and may be considered most effective when used in association with centrifugal pumps. Large motors which drive centrifugal pumps require effective cooling to prevent overheating of their electrical components. Many cooling systems for motors and pump motors are known in the art. Some pump motors use the liquid which is being pumped as the motor coolant and circulate it inside the motor housing in contact with the motor assembly components. This type of construction presents certain problems. Care must be taken to effectively insulate the motor electrical components from contact with solids or pollutants in the pumped liquid contained within the motor chamber.

Other pump motor constructions require great expense through complex machining to the exterior housing of the motor and fitting with a coolant jacket. Still other pump motor constructions submerge the motor assembly components in oil in the motor housing. When submerged in oil, the motor rotor will experience increased drag during operation resulting in friction losses. These friction losses affect the efficiency ratio of the pump motor of rated horsepower to output horsepower. Additionally, the cooling oil has to be monitored because of its likelihood of breaking down due to frictional heating, thereby leading to increased maintenance.

The present invention concerns itself with providing cooling to a pump motor wherein the pump motor assembly operates in air, rather than in oil.

Some attempts have been made in the art to provide cooling to air-filled pump motors. One such attempt is described in U.S. Pat. No. 2,784,672, issued Mar. 12, 1957, which describes a pump and motor assembly having an annular cooling channel formed in a double wall motor housing. The liquid being pumped is circulated through this cooling channel to provide cooling for the pump motor. Because the pump impeller is used to pump the pumped liquid and it through the annular cooling cavity of the motor housing, it increases the draw on the output horsepower of the motor.

Another attempt is described in U.S. Pat. No. 5,250,863, issued Oct. 5, 1993 in which the pump motor housing has a separate exterior cooling jacket positioned over it, offset from its centerline to provide an annular passage of varying thickness for circulation of cooling fluid. This cooling jacket is an additional component and thereby adds to the cost and complexity of the pump. This pump also uses the pump impeller to circulate the coolant through the cooling jacket, which reduces the overall efficiency of the pump.

The present invention is directed to a pump motor housing construction which overcomes the aforementioned disadvantages and provides improved cooling to the pump motor without a substantial reduction of the efficiency of the pump motor.

Accordingly, it is a general object of the present invention to provide a pump motor housing for an air-filled motor assembly with improved heat transfer characteristics.

It is another object of the present invention to provide a centrifugal pump driven by an electric motor which is disposed within a motor housing having a closed loop cooling circuit comprising a plurality of coolant passages extending along the length of the motor housing, the coolant passages being in communication with different fluid pressure regions of a coolant reservoir disposed within the motor housing which fluid pressure differential assists in the circulation of coolant through the cooling circuit.

It is a further object of the present invention to provide a motor housing having an improved cooling means and suitable for use in association with a motor driving a centrifugal pump in which the housing has a plurality of coolant passageways extending along the motor housing, some of the passageways being in communication with a high pressure region of the motor housing and other of the passageways being in communication with a low pressure region of the motor housing, whereby fluid pressure developed during operation of the motor assists in circulating the coolant through the cooling circuit and wherein a coolant reservoir has a heat transfer surface in contact with the liquid being pumped.

It is yet still another object of the present invention to provide a motor housing for a pump motor intended for use on dry-pit centrifugal pumps in which the motor housing has a plurality of cooling passages integrally formed in the housing sidewalls, the cooling passages having a plurality of lift passages with entrance ports communicating with the high pressure area of a reservoir disposed within the housing and the cooling system further including a plurality of coolant return passages with exit ports communicating with the low pressure area of the fluid reservoir, whereby the cooling may be effectively circulated through the cooling circuit by way of a secondary impeller disposed in the motor housing on a motor shaft, the secondary impeller creating the high pressure area at the outermost portions of the reservoir.

Yet another object of the present invention is to provide a pump motor housing within improved cooling characteristics intended for use with in-air motors in which the motor is submerged within the motor housing in a cooling fluid and in which the motor housing incorporates a closed loop cooling fluid pathway, the cooling fluid being driven in circulation through the fluid pathway by means of a vortex impeller disposed on the motor shaft within the housing, the vortex impeller creating, during rotation of the motor thereof, define regions of high and low pressure within an internal fluid reservoir, the cooling fluid entry pathways communicating with the high pressure areas and the cooling fluid return pathways communicating with the low fluid pressure areas to promote efficient circulation of cooling fluid throughout the interior of the pump motor housing.

These and other objects, features and advantages of the present invention will be clearly understood through consideration of the following detailed description.

BRIEF DESCRIPTION OF THE DRAWINGS

In the course of the following detailed description, reference will be made to the attached drawings wherein like reference numerals identify like parts and wherein:

FIG. 4 is a horizontal sectional view of the motor housing shell member taken along lines 4—4 of FIG. 1 illustrating the vertical extension of the coolant return passages along the section line;

FIG. 5 is a horizontal sectional view of the motor housing shell member taken along lines 5—5 of FIG. 1 illustrating a preferred layout of the coolant lift and return passages;

FIG. 6 is a plan view of the lower cover plate of the pump motor housing of FIG. 1 illustrating the placement of a vent and two extensions of the coolant return passages;

FIG. 7 is a vertical sectional view taken along the lines 7—7 of FIG. 6;

DETAILED DESCRIPTION OF THE INVENTION

Figure 1:
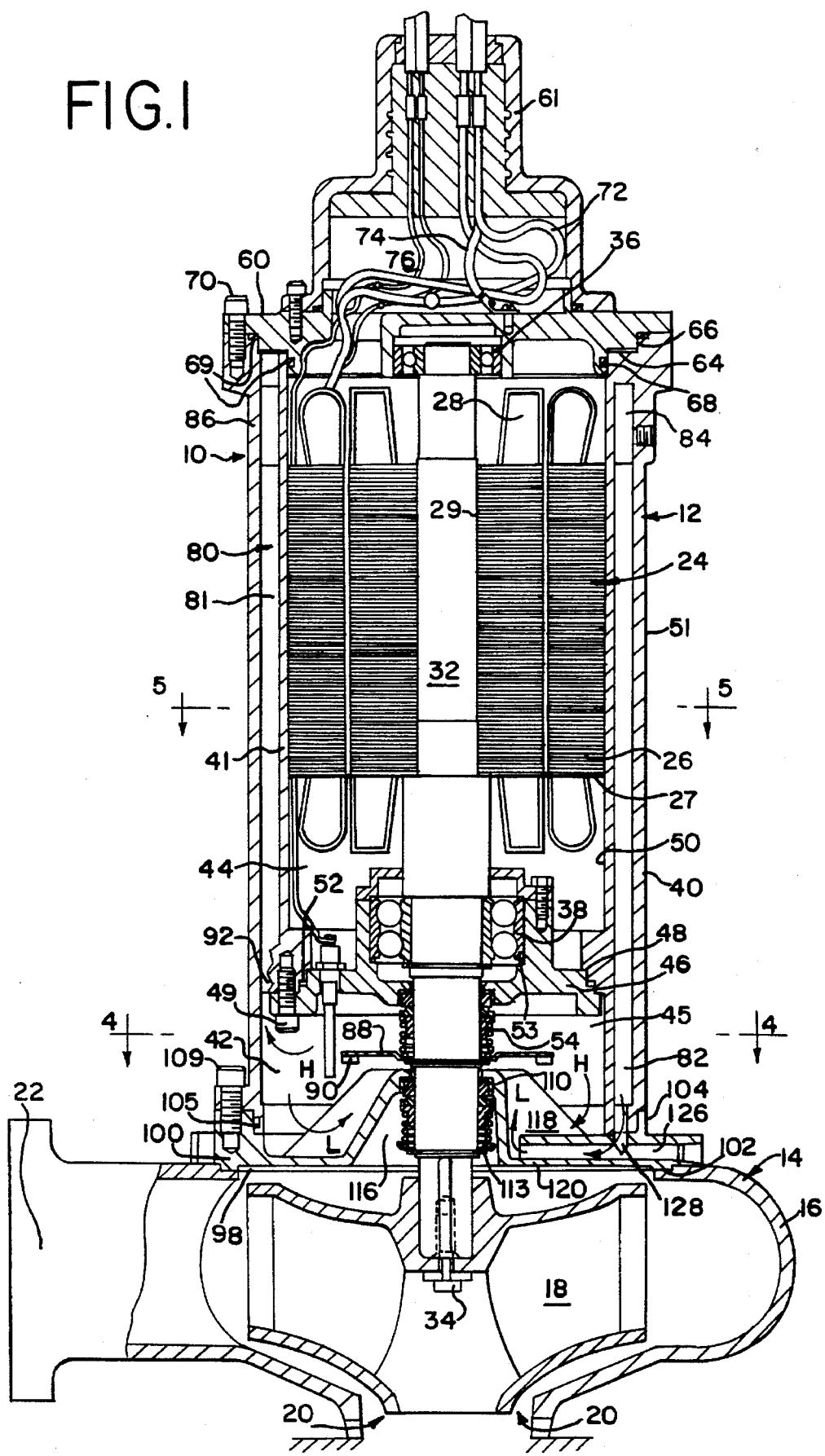
FIG. 1 is an elevational view, taken in section, of a dry-pit centrifugal pump driven by an electric motor utilizing a housing constructed in accordance with the principles of the present invention.

Referring to the drawings, and in particular to FIG. 1, a pump-motor assembly 10 is illustrated which incorporates a motor housing 12 constructed in accordance with the principles of the present invention. The pump-motor assembly 10 includes a centrifugal pump 14 having a pump volute casing 16 with an internal pump impeller 18 rotatably mounted therein. The volute casing 16 includes a pump inlet 20 and a pump outlet 22 located at different portions of the casing 16 through which liquid is pumped by rotation of the impeller 18 in a manner well understood in the art.

The pump-motor assembly 10 illustrated is exemplary of the construction of vertical centrifugal pumps which are commonly used in the sewage and wastewater treatment industry. Such pumps are commonly referred to as dry-pit pumps because both the motor and pump portions thereof stand alone in air, as distinguished from submersible pumps, commonly referred to as wet-pit pumps, wherein the pump and motor portion sit submerged in the liquid being pumped. As will become apparent through the following description, the present invention is most suitably applied to vertical dry-pit pumps, but may also have equal utility to submersible and horizontal pumps and those used in marine, drainage and irrigation applications, for example.

The pump 14 is driven by an electric motor assembly 24 which is mounted to the pump 14 by way of a motor housing 12 disposed in contact with the volute casing 16. The motor assembly 24 is conventional and includes a stator portion 26 made up of a series of conventional lamination 27 with a plurality of electrical windings thereon. The stator portion 26 is disposed in the housing 12 and surrounds a motor rotor portion 28 mounted on a driveshaft 32. Similar to the stator portion 26, the rotor portion 28 also includes a plurality of laminations 29. The driveshaft 32 extends longitudinally within the motor housing 12 so that the rotor portion 28 and stator portion 26 are in general alignment with each other in a coaxial relationship. The driveshaft 32 extends from the motor housing 12 into the pump casing 16 where it engages the pump impeller 18 and is attached thereto by one or more securement members 34. The driveshaft 32 is supported at its opposing ends within the motor housing 12 by two opposing bearing members 36, 38 which resist the radial and thrust loads which may occur during operation of the pump 14.

Turning specifically to the motor housing 12, it can be seen that the motor housing 12 includes an elongated cylindrical shell member 40, an upper cover plate or radial bearing housing 60 and a lower cover plate 96. The shell member 40 includes two distinct portions: a first, or lower portion 42, and a second, or upper portion 44. The upper portion 44 contains the primary components which make up the motor assembly 24, namely the stator and rotor portions 28, 26, and thus it may be considered as a "motor chamber". The lower portion 42 defines the boundaries of a coolant chamber, or reservoir 45, which contains a preselected volume of coolant.

These two chamber portions 42, 44 are separated from each other within the shell member 40 by means of a circular endplate 46 which contacts an inner circular ridge or recess 48 formed within the shell member 40 and is held in place thereby by means of securement members 49. The ridge 48 extends inwardly from the inner surface 50 of the housing shell member sidewall 41 and provides an engagement surface which opposes the endplate 46. One or more elastomeric O-rings 52 are positioned between the endplate 46 and the housing ridge 48 to ensure a fluid-tight seal between the motor chamber 44 and the coolant reservoir 45. The endplate 46 preferably also includes a recess 53 which receives the lower bearing member 38, illustrated as a double roller bearing. The driveshaft 32 also preferably includes a mechanical seal assembly 54 which provides a seal between the motor housing endplate 46 and driveshaft 32 to prevent migration of coolant from the coolant reservoir 45 into the motor chamber 44.

Figure 3:
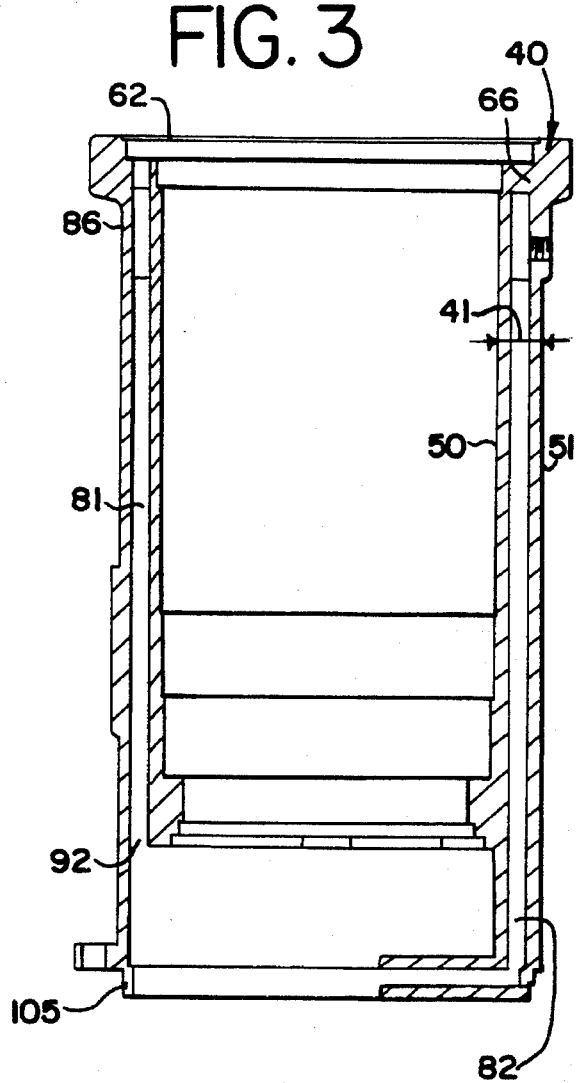
FIG. 3 is a vertical sectional view of the shell member of the pump motor housing of FIG. 1, with its internal components removed showing the relationship between the cooling passages and the coolant reservoir of the housing.

The circular cover plate 60, engages the upper open end 62 of the housing shell member 40 and seals the motor chamber 44. Cover plate 60 may include one or more rims 64 which engage complementary recesses 66 in the shell member 40 (FIG. 3) and may further include O-rings 68 disposed within channels 69 formed in the cover plate 60 or shell member 40 to seal the respective housing members. The cover plate 60 is secured in place to the shell member 40 by securement members 70. In addition to sealing the motor chamber 44, the cover plate 60 also provides a foundation for a head cap 61 which encloses electrical connections to the motor stator and rotor, such as power leads 72, ground 74 and instrumentation leads 76, for example.

In an important aspect of the present invention, the coolant reservoir 45 is isolated from the motor chamber 44 and the motor assembly 24 disposed therein. Coolant is circulated from the reservoir 45 around the shell member 40 in the vicinity at the motor chamber 44 to provide effective and reliable removal of heat generated during operation of the motor assembly 24. This heat is absorbed by the coolant and is transferred primarily to the pumped liquid and secondarily to the surrounding atmosphere. In this regard, the present invention provides a closed loop cooling circuit in contact with the cylindrical shell member 40 by which coolant is circulated during rotation of the motor driveshaft 32. As best illustrated in FIG. 2, wherein a portion of the motor housing sidewall 41 and endplate 46 have been removed for clarity, this cooling circuit includes a network of longitudinal passages 80 incorporated along the shell member 40 between the coolant reservoir 45 and the motor chamber 44.

These passages 80 extend upwardly through the shell member 40 along the length of the motor assembly 24 until they are generally opposite the uppermost portions of the stator and rotor 26, 28 as illustrated in FIG. 1. Some of these passages, shown at 81, convey coolant for substantially the entire length of the housing shell member 40 upwardly from the reservoir 45 and serve as coolant "lift" passages, while other of these passages 82 convey the coolant back along the cylindrical shell member 40 back to the reservoir 45. These latter passages serve as coolant "return" passages. These lift and return passages 81, 82, as illustrated, the passages 80 may be preferably formed integrally within the sidewall 41 of the shell member 40 and may be most easily incorporated along the housing by casting during the manufacture of the shell member 40. However, it is also contemplated that other suitable methods for forming the passages 80 may also be used, such as by conventional machining or electrical discharge machining ("EDM"). Alternatively, the coolant passages 80 may also be formed separately and subsequently applied to the shell member 40 in a manner known in the art so that the passages become incorporated with the shell member 40.

Figure 2:
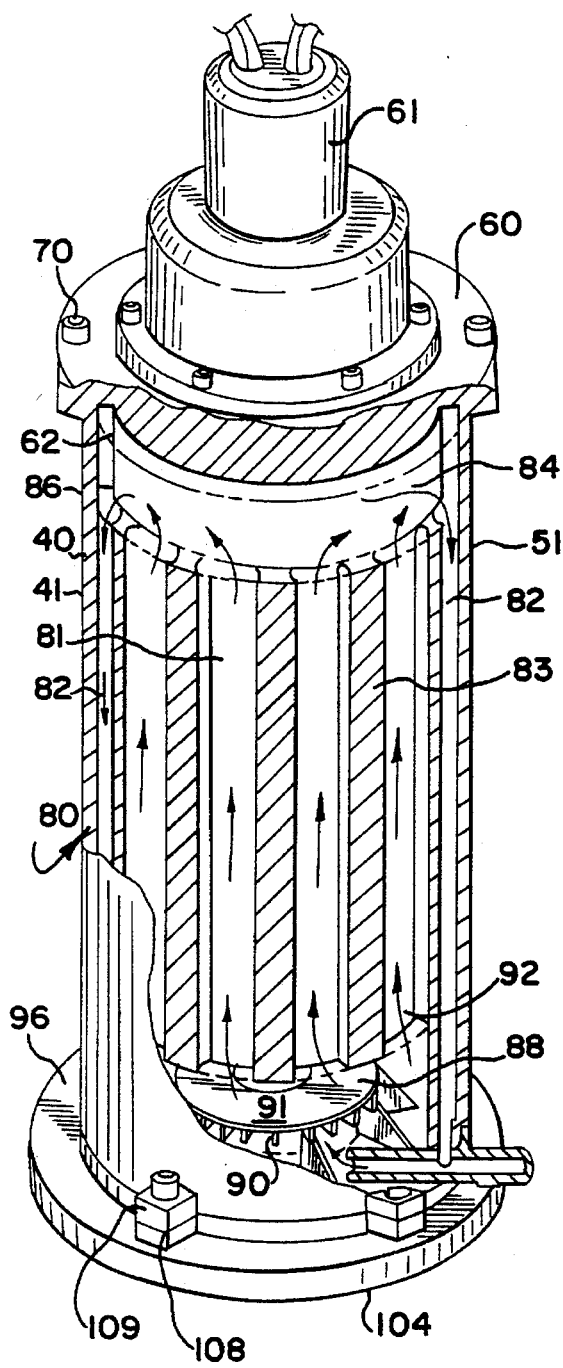
FIG. 2 is a perspective view of the motor housing of FIG. 1, partially in section, and with some components removed for clarity, illustrating the relative placement of the coolant passages along the extent of the motor housing.

As seen in FIG. 2, the lift and return passages 81, 82 are arranged longitudinally along the cylindrical shell member sidewall 41 in a manner so, that they extend generally vertically when the motor housing 12 is mounted upon the pump 14. The passages 80 are spaced apart from each other within the sidewall 41 by intervening land portions 83. The spacing between adjoining passages may be chosen so as to provide structural support to the cylindrical shell member sidewall 41, as well as to increase the total surface area available to the circulating coolant for the greatest amount of cooling. In observing operation of motors incorporating the motor housing 12 of the present invention wherein the passages 80, 84 are integrally formed in the shell member sidewall 41, no structural weaknesses or deficiencies in the housing 12 have been noted.

The lift and return passages 81, 82 communicate with an annular circulation cavity, or header passage 84, located along the uppermost portion 86 of the shell member 40 in the area thereof which opposes the motor assembly rotor and stator portions. This circulation passage 84 provides a passageway for coolant drawn from the reservoir 45 upwardly through the lift passages 81 to return to the coolant reservoir 45 by flowing downwardly through the return passages 82 as illustrated by the arrows in FIG. 2. The number of lift and return passages 81, 82 and the locations of the return passages 82 along the circular path may be selected to permit efficient cooling. Satisfactory results have been obtained by using the arrangement shown in FIG. 5, which is a cross-section of the shell member 40, illustrating two return passages 82 and eight lift passages 81.

In another important aspect of the present invention, the respective lift and return passages 81, 82 communicate with the coolant reservoir 45 at different locations therein. These distinct locations correspond to high and low fluid pressure regions which are formed in the reservoir 45 by the impeller 88 during operation of the pump 14. The coolant is driven, or circulated through the circuit by a suitable fluid driving means, illustrated as an impeller 88, which is rotatably mounted on the portion of the driveshaft 32 which extends through the reservoir 45. The impeller 88 may be of the type referred to in the art as a vortex impeller having a plurality of vanes 90 which extending outwardly from a horizontal base 91 thereof. The vanes 90 contact the coolant during rotation and circulate it through cooling circuit.

During operation of the motor assembly 24, the driveshaft 32 rotates and induces a like rotation in the impeller 88 which causes coolant in the reservoir 45 to be accelerated radially from the central portions of the reservoir at increased pressure circumferentially outwardly from the impeller in a manner well known by those skilled in the art. The fluid pressure in the area of the reservoir 45 radially outermost of the impeller 88 increases and becomes a region of relative high fluid pressure and is designated "H" in the drawings. The entrance ports 92 of the lift passages 81 are preferably disposed generally above the horizontal plane defined by the impeller base 91 and proximate to the motor chamber endplate 46. The exit ports 94 of the coolant return passages 82 extend into the coolant reservoir 45 and are disposed generally opposite the entrance ports 92 of the lift passages 81. In this regard, the return passage exit openings 94 are disposed radially inwardly of and generally beneath the vortex impeller 88 in a low pressure region of the reservoir, designated as "L".

As mentioned above, the cylindrical shell member 40 also includes a lower cover plate 96 (FIG. 6.) which defines the lower boundary of the coolant reservoir 45. The lower cover plate 96 may form the bottom of the overall motor housing 12, as illustrated, and its exterior surface 98 forms the upper portion of the pump volute casing 16. This surface 98 is in contact with pumped liquid during operation of the pump 14 and therefore, the lower cover plate 96 serves as the primary heat transfer surface by which the coolant of the reservoir 45 exchanges heat. This exchange occurs with the liquid being pumped by the pump 14. The outer surface 51 of the shell member 40 may be considered as a secondary heat transfer surface, wherein heat transfer occurs between the coolant circulating in the passages 80 and the atmosphere.

The lower cover plate 96, as illustrated in FIGS. 6 and 7, is generally circular and includes an outer circumferential skirt 100 which engages a complimentary rim 102 of the pump volute casing 16. The lower cover plate 96 also has a circular lip 104 which engages an opposing circumferential sleeve 105 of the motor housing shell member 40. This lip 104 includes a series of bosses 108 arranged around the circumference thereof which receive assembly bolts 109 by which the lower cover plate 96 may be joined to the shell member 40 to form an integral motor housing 12.

The lower seal member 96 further includes a central bore 110 which receives the motor driveshaft 32 therein and may include a recess 112 which supports one or more mechanical shaft seals 113 and associated packing which prevents leakage between the pump and the coolant reservoir 45. The bore 110 is centrally located in a raised, central portion 114 of the lower cover plate 96. This raised central portion 114 has a general frusto-conical shape and may include a like-shaped cavity 116 on the pump side surface 98 of the lower cover plate 96. A series of radial ribs 118 may preferably be provided in manufacturing of the lower cover plate 96 to improve the stability of it during casting. Additionally, these radial ribs 118 also increase the total available surface area of the lower cover plate 96 for heat transfer purposes and impart turbulence to the coolant circulating throughout the coolant reservoir 45.

A series of horizontal bosses 119, 120 may also be formed in the lower cover plate 96 which provide foundations for return passage exit openings 94 or for a vent passage 302, as explained below. Two of these bosses 120 extend inwardly and terminate proximate to the raised, central portion 114. Each of the bosses 120 contains a bore 126 which serves as a horizontal extension of the return passages 82. One end of the bore 126 may extend through the lower cover plate 96 to the atmosphere and may be threaded to receive a plug (not shown) to facilitate the filling and draining of coolant into and out of the coolant reservoir 45. The bore 126 also includes a vertical portion 128 aligned with the return passages 82 of the shell member 40.

During operation of the pump, the motor assembly rotates and the vortex impeller 88 turns and applies a centrifugal force to the coolant in reservoir 45. Coolant is forced radially outwardly against the inner surfaces of the cylindrical shell member sidewall 41 and up through the lift passage entrance ports 92. The coolant traverses the lift passages 81, enters the annular circulation passage 84, enters the return passages 82 and flows out the return passage exit ports 94 into the reservoir 45. During operation of the motor assembly 24, the rotor portion 28 rotates within the stator portion 26 and generates heat which is conducted to the shell member 40 via its inner surface 50. While circulating through the cooling passages 80, 84, the coolant absorbs heat from the shell member sidewall inner surface 50 because the coolant has a temperature less than the temperature of the motor chamber 44 and the shell member sidewall inner surface 50. Some of this absorbed heat is transferred during circulation to the atmosphere through the outer surface 51 of the shell member 40, but primarily, the heat is transferred to the pumped liquid via the lower cover plate 96.

The heated coolant is circulated to the reservoir 45 where it contacts the lower cover plate 96. The coolant not only circulates in the manner shown by the arrows in FIG. 1, but it also travels in and out of the arc-like sections 130 created between the ribs 118, discharging heat to the lower cover plate 96 by conduction. The cover plate 96 is maintained at a proper cooling temperature by its contact with the pumped liquid along surface 98. Thus, the combination of the vertical and horizontal passages 80, 84 and the reservoir 45 create, in effect, a closed loop cooling circuit for the motor assembly 24.

Figure 8:
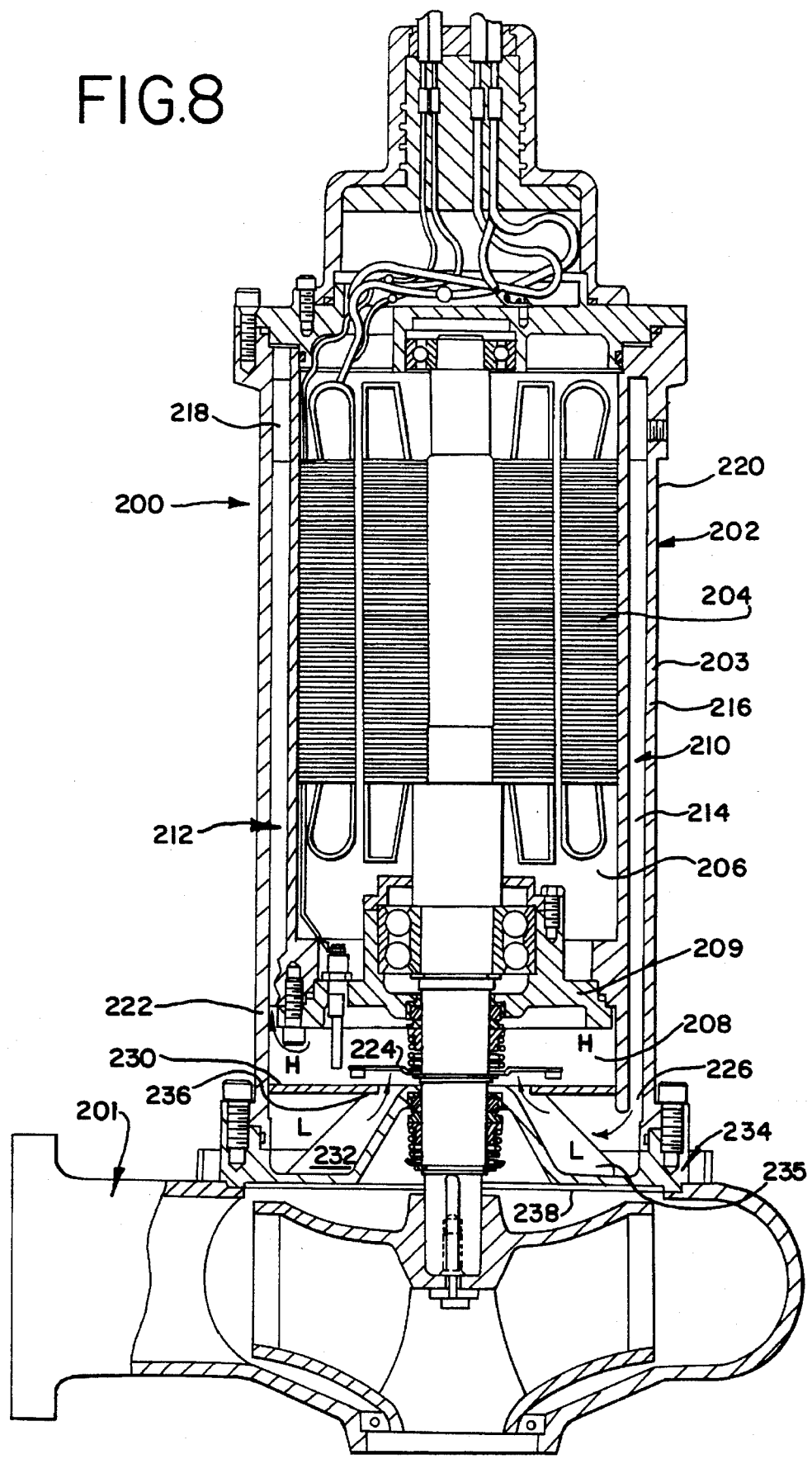
FIG. 8 is an elevational view, taken in section, of a centrifugal pump driven by an electric motor and illustrating an alternate embodiment of a pump motor housing constructed in accordance with the principles of the present invention.
Figure 9:
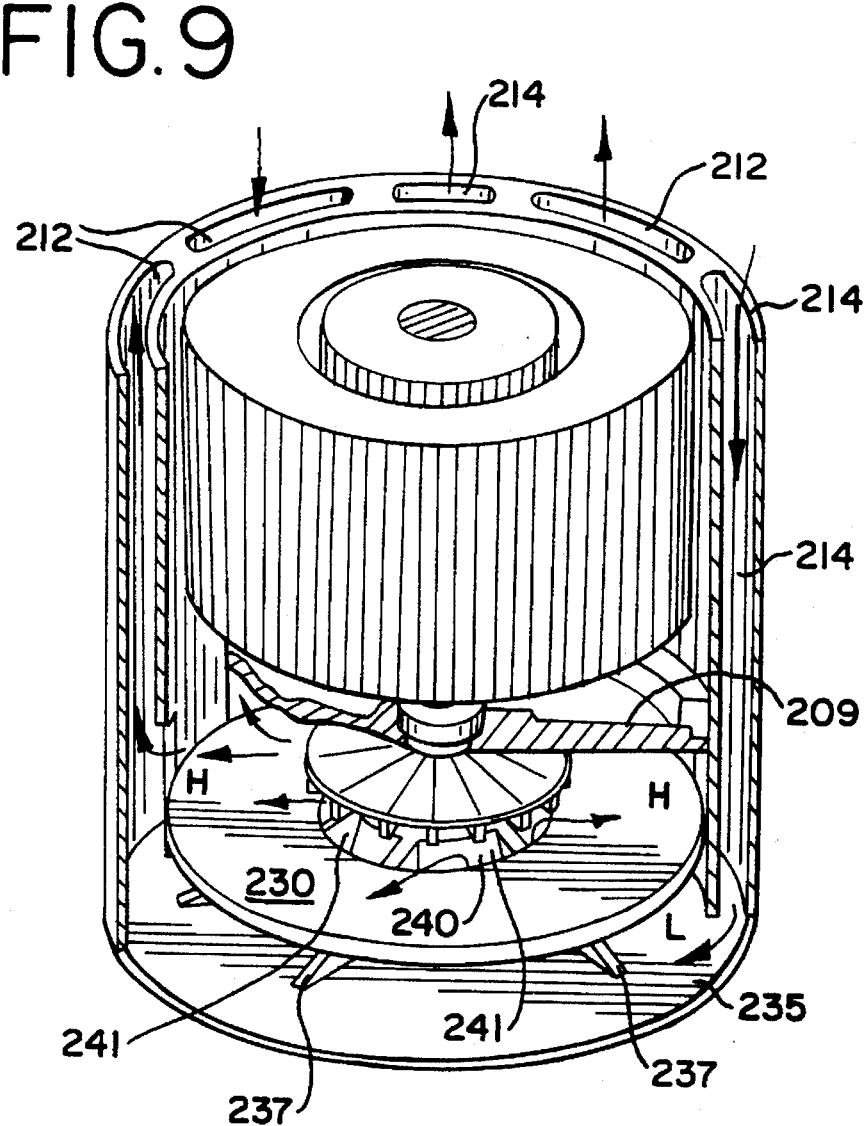
FIG. 9 is a perspective view, partially in section, of the lower portion of the pump motor housing of FIG. 8 with a portion of the endplate member partially removed for clarity; and, FIG. 10 is a sectional view of the lower cover plate showing the location of a vent passage.
Figure 10:
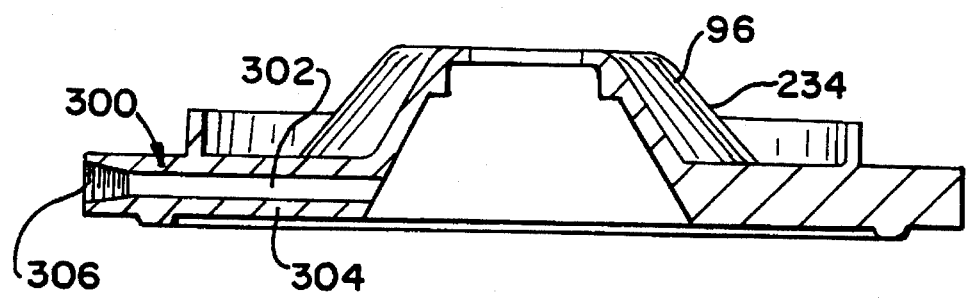

FIGS. 8–10 illustrate another embodiment of a pump motor assembly 200 having a housing 202 constructed in accordance with the principles of the present invention in which the return passages are slightly modified as compared to the embodiment of the invention illustrated in FIGS. 1–7. In this embodiment, the motor housing 202 includes a cylindrical shell member 203 housing the electric motor assembly 204 and which is divided into two distinct portions 206, 208 by an endplate member 209 affixed to the shell member 203.

The motor assembly 204 is housed in an upper motor chamber 206 while the coolant is housed a lower coolant reservoir 208. The shell member 203 includes a plurality of longitudinal cooling passages 210 similar to the passages 80 described hereinabove with respect to the embodiment of FIGS. 1–7. These passages 210 include coolant lift passages 212 and coolant return passages 214, which extend for a substantial portion of the length of the cylindrical shell member 203 along the motor chamber 206. The passages 210, 212 communicate with an annular header passage 218 which extends circumferentially within the shell member sidewall 216 at its upper portion 220. The coolant lift passages 212 have their entrance ports 222 disposed generally above and radially outwardly of a coolant circulation means, illustrated as impeller 224, while the return passages 214 have their respective exit openings 226 disposed within the shell member sidewall 216 generally beneath the impeller 224.

In order to ensure that the return passages 214 effectively communicate with the low pressure regions, L, of the coolant reservoir 208, a means for dividing the reservoir 208 into two distinct pressure regions is provided illustrated in FIGS. 8 and 9 as an annular dividing member 230. The annular dividing member 230 engages the raised central hub portion 232 of the housing lower cover plate 234 at a series of notches 236 formed therein. Radial ribs 237 extend radially outwardly from the central hub 232 through the reservoir 208 to the shell member sidewall 216. The dividing plate 230 has an inner diameter which is generally greater than the central hub portion 232 to define an annular opening 240 outwardly of the central portion hub 232 which provides for fluid communication between the high and low fluid pressure sections H, L of the coolant reservoir 208.

The radial ribs 237 also divide the annular opening 240 into a plurality of smaller openings 241, each of which includes an arc-like segment of the annulus defined by the opening. These annular openings 241 are located in the low pressure region L of the coolant reservoir 208, generally beneath and radially inwardly of the impeller 224.

During operation of the pump 201, rotation of the motor assembly 204 rotates the impeller 224 in the reservoir 208 to pump coolant outwardly in the reservoir to develop a high pressure region H radially outwardly from the impeller 224, thus forcing coolant up through the coolant lift passages 212, through the circulation passage 218, down into the coolant return passages 214 and into the reservoir 208. Because the return passages 214 communicate with the reservoir 208 beneath the dividing plate 230 in the suction zone, or low pressure region L of the reservoir 208, the coolant is then drawn through the annular openings 241 of the dividing plate 230, as illustrated by the arrows in FIGS. 8 and 9. During circulation in the reservoir, coolant contacts the exposed surfaces 235 of the lower seal member 234 which are significantly cooler than the rest of the housing structure because of the lower member's contact with the liquid being pumped by the pump 201 on the opposite, i.e., the pump side 238 of the lower cover plate 234. The primary heat transfer from the coolant occurs along this surface, with some secondary heat transfer occurring along the exterior walls of the motor housing 200.

FIG. 10 illustrates a venting means 300 which is particularly useful with the present invention. The venting means 300 includes a passage or bore 302 formed in the lower cover plate 234 which extends radially inwardly therein from outside of the overall motor housing to the central hub portion 232. The bore 302 extends within one of the boss portions 304 formed in the lower housing seal member and up into the central hub portion. The bore 302, as illustrated, may include a threaded portion 306 which receives a petcock or other control member (not shown) which may be operated to permit the passage of air out of the pump volute casing to the atmosphere. This venting means 300 is disposed in the lower cover plate 234, rather than in the housing of the mechanical seal assembly between the pump and the motor housing, thereby simplifying the overall cost and construction of the housing.

In operation, when the pump begins to rotate or when the pump impeller begins to rotate, the pump volute casing will normally contain some air. As the impeller rotates, the volute casing, which is filled with the liquid being pumped, and some of the air in the casing exits with the pumped liquid while some of the air accumulates under pressure in the top cavity of the volute casing. The venting means 300 is then opened and the air bleeds out of the cavity 116 under pressure by the pumped liquid until the pumped liquid occupies substantially all of the area inside the volute cavity 116. Venting this air is important inasmuch as it eliminates pockets of air from contacting the lower cover plate 234 and forming an insulating layer to inhibit effective heat transfer between the coolant reservoir and the pumped liquid. Preferably, the horizontal elevation of the bore 302 relative to the lower cover plate 234 is such that the bore 302 penetrates into the cavity 116 at approximately the highest point thereof to ensure proper venting of all of the air in the volute casing.

The closed loop cooling system of the present invention provides certain benefits in addition to its cooling benefits. For example, because the motor chamber of the motor housing of the present invention is filled with air rather than oil, the motor rotor does not experience any significant friction losses during operation as are experienced with oil filled motor housings. Pump motors utilizing the novel cooling means of the present invention are able to achieve substantially a 1:1 efficiency ratio of a rated horsepower to output horsepower. That is, there is no substantial loss of rated horsepower during operation of the motor due to friction losses incurred by movement through a liquid cooling medium such as oil, and because the vortex impeller has proven to be a very low draw on the horsepower of the motor. During testing of motors built in accordance with the present invention rated at 50 horsepower, the draw of the vortex impeller observed has been less than 1 horsepower, or less than a 2% draw. Additionally, there is reduced maintenance with pump motors of the present invention as compared to oil-filled motors in that there is no need to monitor the makeup of the coolant for either contamination or breakdown due to friction with the motor.

It has been found through testing that motors utilizing the motor housing of the present invention achieve a thermal equilibrium in a very short time period. The tests were conducted between various rated horsepower motors similar to that depicted in FIG. 1. In this testing, a Yeomans Chicago Corporation 9200 Series motor assembly was encased in a motor housing having a construction described in the first embodiment and shown in FIGS. 1–7. Thermocouples were placed on the motor windings at three locations in order to monitor the temperature of the motor windings. The motor was attached to a centrifugal pump and the pump operated to pump liquid to determine the time needed for stabilization of the temperature of the motor windings. The stabilization temperature was determined to be that temperature of the motor which did not increase significantly over at least a 60 minute time span as evidenced by readings of the thermocouples ranging between 1°–3° F. over a period of at least 60 minutes. Tests were run at different horsepowers at an ambient temperature of about 61° F. and are summarized below.

| Test | Brake HP | Average Start Temp. (°F.) | Total Operation Time (HR) | Average Time to Reach Equilibrium (HR) | Observed Equilibrium Temp. (°F.) | Time at Equilibrium (HR) |
|---|---|---|---|---|---|---|
| 1 | 25 | 51.0 | 3.25 | 2.0 | 157.6 | 1.25 |
| 2 | 30 | 157.6 | 2.25 | 1.25 | 174.0 | 1.0 |
| 3 | 35 | 174.0 | 3.5 | 2.5 | 191.0 | 1.0 |

-continued

| Test | Brake HP | Average Start Temp. (°F.) | Total Operation Time (HR) | Average Time to Reach Equilibrium (HR) | Observed Equilibrium Temp. (°F.) | Time at Equilibrium (HR) |
|---|---|---|---|---|---|---|
| 4 | 40 | 191.0 | 2.5 | 1.5 | 221.0 | 1.0 |
| 5 | 45 | 221.0 | 2.5 | 1.5 | 252.6 | 1.0 |
| 6 | 50 | 57.3 | 5 | 3.5 | 287.3 | 1.5 |

The test results indicate that the present invention effectively cools centrifugal pump motors and permits them to reach a stabilization temperature anywhere between approximately 1.25 hours and 3.5 hours depending on the rated horsepower of the motor and test start temperature.

Thus it will be seen that the present invention provides an improved motor housing having a number of advantages and characteristics, including those herein indicated and others which are inherent in the invention. Since modification and variations of the illustrated construction will be apparent to those skilled in the art, it is anticipated that such modifications and changes may be made without departing from the spirit of the invention or the scope of the appended claims.

We claim:

1. A closed loop cooling system for a motor operated pump in which the pump has a pump impeller rotatably mounted within a pump casing, the cooling system comprising:

a motor assembly, a housing member surrounding the motor assembly, the housing member having a motor chamber and a coolant reservoir defined therein, said housing member having a circumferential sidewall portion, the sidewall portion having a plurality of first and second passages integrally formed within said housing member, such that the first and second passages are entirely contained within said housing member sidewall portion, said first and second passages extending within said housing member sidewall portion proximate to said motor chamber, the coolant reservoir including means for circulating coolant through said cooling system, the coolant circulation means creating, during operation of said pump, high and low pressure regions in said coolant reservoir, said first passages having entrance ports which communicate with said coolant reservoir at the high pressure regions thereof and said second passages having exit ports which communicate with said coolant reservoir at said low pressure regions thereof, said first and second passages being interconnected at ends opposite their respective entrance and exit ports.

2. The cooling system of claim 1, wherein said housing member includes a cylindrical shell member, and two opposing seal members operatively connected to said shell member, one of said seal members forming a part of said cooling reservoir and a part of said pump casing, thereby defining a primary heat transfer surface having coolant contained in said coolant reservoir on one side thereof and liquid contained in said pump casing and being pumped by said pump on the other side thereof, said housing member sidewall portion having an exterior surface in close proximity to said first and second passages and thereby defining a secondary heat transfer surface, whereby coolant which is circulated through said first and second passages by said coolant circulation means absorbs heat generated by said motor assembly during the operation thereof and discharges said absorbed heat to said coolant reservoir by way of said primary heat transfer surface and to the atmosphere surrounding said housing member by way of said secondary heat transfer surface.

3. The cooling system of claim 1, wherein said first passages are disposed generally parallel to a longitudinal axis of said motor assembly and wherein said second passages have distinct first and second portions, the second passage first portions being disposed generally parallel to said motor assembly axis and said second passage second portions being angularly offset from said first portions and said motor assembly axis and extending radially inwardly from said second passage first portions into communication with said low pressure regions.

4. The cooling system of claim 1, wherein said coolant circulation means includes an impeller member disposed in said coolant reservoir and co-rotatable with said motor assembly, the impeller member having a base with a preselected diameter, said first passage entrance ports communicating with said coolant reservoir radially outwardly of said impeller member based diameter, said second passage exit ports communicating with said coolant reservoir radially inwardly of said impeller member based diameter.

5. The cooling system of claim 1, wherein said housing member includes an annular circulation passage which interconnects said first and second passages.

6. The cooling system of claim 5, wherein said first and second passages and said annular circulation passage cooperate to define a cylindrical network of passages associated with said sidewall portion of said housing member which substantially surrounds said motor assembly.

7. The cooling system of claim 5, wherein said annular circulation passage is also integrally formed within said housing member and entirely contained within said housing member sidewall portion.

8. The cooling assembly of claim 1, wherein said first and second passages extend for approximately substantially the entire length of said motor assembly disposed within said motor chamber.

9. The cooling system of claim 1, wherein said first and second passages are spaced apart within said housing member sidewall portion by intervening land portions.

10. The cooling system of claim 9, wherein said housing member includes at least one cover plate member interposed between said housing member and said pump casing, wherein the cover plate member includes at least one extension of said second passages, said extension being integrally formed within said cover plate.

11. The cooling system of claim 1, wherein said housing member includes a lower cover portion, the lower cover portion being interposed between said coolant reservoir and said pump casing, thereby defining a heat transfer surface between said motor housing and said pump casing, the lower cover portion having a vent passage extending therethrough and having an opening on one end into said pump casing and opening on the other end into the atmosphere surrounding said motor housing, whereby air accumulating in said pump casing during operation of said pump may be discharged through said vent passage.

12. The cooling system of claim 1, wherein said coolant reservoir includes a coolant reservoir dividing member spaced apart from said coolant circulation means and dividing said coolant reservoir into two portions corresponding with said high and low pressure regions of said coolant reservoir, the coolant reservoir dividing member having a central opening disposed therein aligned with said coolant circulation means.

13. The cooling system of claim 12, wherein said first and second passages respectively communicate with said coolant reservoir of opposite sides of said dividing member.

14. A motor having a cooling means therefor, comprising a motor housing, the housing enclosing a motor assembly, said housing having a motor chamber portion and a cooling fluid retention portion, the motor assembly being disposed within the motor chamber portion, the cooling fluid retention portion providing a reservoir of cooling fluid for the cooling means, said housing having a wall segment substantially surrounding said motor chamber, the housing wall segment having a predetermined wall thickness defined by opposing interior and exterior surfaces thereof, said cooling means including a network of cooling passages disposed entirely within said housing wall segment and integrally formed therein between said housing wall segment opposing interior and exterior surfaces, the cooling passages axially extending for substantially the entire length of said motor chamber, said cooling passages being further divided into two groups, one of said two groups including at least one cooling lift passage which conveys cooling fluid from said coolant reservoir through said housing wall segment and the other of said two groups containing at least one cooling return passage which returns cooling fluid from said cooling lift passage to said reservoir, said reservoir having means disposed therein and operatively associated with said motor assembly for circulating said cooling fluid through said cooling passages, said cooling lift passage communicating with said reservoir at an area of high fluid pressure developed therein by said cooling fluid circulation means and said cooling return passages communicating with said reservoir at an area of low fluid pressure developed therein by said cooling fluid circulation means.

15. The motor of claim 14, wherein said cooling fluid circulation means includes an impeller member.

16. The motor of claim 15, wherein said cooling lift passage communicates with said reservoir outwardly of said cooling fluid circulation means and said cooling return passage communicates with said reservoir inwardly of said impeller.

17. The motor of claim 14, wherein said cooling lift passage communicates with said reservoir on one side of said cooling fluid circulation means and said cooling return passage communicates with said reservoir on another side of said cooling fluid circulation means.

18. The motor of claim 14, wherein said housing includes a heat transfer member which forms a part of said reservoir, said cooling return passage extending along a portion of said heat transfer member, said heat transfer member including a plurality of ribs extending out from said heat transfer member, the ribs providing additional surface area to said heat transfer member, thereby increasing the total surface area of said heat transfer member available for heat transfer.

19. The motor of claim 14, wherein said reservoir includes an annular, generally planar reservoir dividing member dividing said reservoir into said high and low fluid pressure regions.

20. The motor of claim 18, wherein said housing wall segment includes a header passage interconnecting said cooling lift and return passages.

21. In a pump having a pump component and a motor component operatively connected to the pump component, the motor component including a motor assembly mounted for rotation within a motor chamber of a housing member, the housing member having a sidewall portion substantially surrounding the motor chamber, the sidewall portion having a predetermined thickness defined by opposing inner and outer surfaces thereof, said sidewall portion having a plurality of first and second cooling passages integrally formed entirely within said housing member and between said sidewall portion inner and outer surfaces, the first and second cooling passages longitudinally extending within said sidewall portion, said first and second cooling passages being interconnected at one end thereof, the first and second cooling passage interconnection being disposed proximate a first end of said housing member, said first and second cooling passages at their opposite ends communicating with a cooling fluid chamber disposed in said housing member proximate to a second end of said housing member, said first cooling passages further communicating with said cooling fluid chamber at a high fluid pressure region of said cooling fluid chamber, said second cooling passages further communicating with said cooling fluid chamber at a low fluid pressure region of said cooling fluid chamber, the high and low fluid pressure regions occurring during operation of said pump, said pump further including a member corotatable with said motor assembly for circulating said cooling fluid in and out of said first and second cooling passages during operation of said pump to create said high and low fluid pressure regions.

22. The pump of claim 21, wherein said first and second cooling passages are interconnected by an annular passage extending around said housing member.

23. The pump of claim 21, wherein said first cooling passages extend longitudinally through said housing member sidewall portion and said second cooling passages have distinct first and second portions, said second cooling passage first portions extending substantially parallel to said first cooling passages and said second cooling passage second portions extending generally perpendicularly to said second cooling passage first portions.

24. The pump of claim 23, wherein said second cooling passage first portions are disposed in said housing member and said second cooling passage second portions are disposed in an end member interposed between said housing member and said pump component.

25. The pump of claim 21, wherein said first cooling passages communicate with said cooling fluid chamber at a location radially outwardly of said second cooling passages.

26. The pump of claim 21, further includes a member disposed in said cooling chamber dividing said cooling chamber into said high and low fluid pressure regions, said first cooling passages communicating with said cooling chamber on one side of said dividing member and said second cooling passages communicating with said cooling chamber on another side of said dividing member, said dividing member including at least one opening disposed therein providing a pathway between said high and low fluid pressure regions.

27. The pump of claim 26, wherein said cooling chamber includes means dividing said pathway into a plurality of discrete subpathways.

28. The pump of claim 27, wherein said dividing member is an annular plate which engages a cover plate interposed between said pump component and said housing member, said dividing member opening engaging part of said cover plate in a manner to form a said subpathways between said dividing member and said cover plate.

29. The pump of claim 21, wherein said housing member sidewall portion has a substantially uniform sidewall thickness between said first and second ends thereof.

30. A pump motor for driving a centrifugal pump during the pumping of a fluid through a pump casing which encloses a rotatable pump impeller, the pump motor comprising: a motor assembly, a housing member enclosing the motor assembly, said motor assembly including a rotor portion and a stator portion, the motor rotor portion being rotatably mounted on a driveshaft extending longitudinally through a portion of the motor housing member and into a portion of said pump casing, the motor stator portion being mounted within said motor housing member such that it substantially surrounds said rotor portion, each of said motor rotor and stator portions including a plurality of electrical windings thereon, said motor housing having a first end adapted to engage the pump casing such that said motor driveshaft extends into the pump casing to rotatably engage said pump impeller in said pump casing, whereby rotation of said motor driveshaft induces a like rotation of said pump impeller in said pump casing, said motor housing member first end including a heat transfer member which is interposed between liquid pumped through said pump casing and coolant contained in a reservoir disposed in said housing member, said motor housing member further including a plurality of first and second cooling passages integrally formed entirely within said motor housing member and extending along a sidewall portion of said motor housing member, said first and second cooling passages being defined within said housing member by intervening land portions thereof and by opposing interior and exterior surfaces of the housing member sidewall portion said first cooling passages communicating, at entrance ports thereof, with high pressure regions defined in said reservoir during operation of said pump motor, said first coolant passages serving to convey coolant out of said reservoir along said motor housing member sidewall portion, said second coolant passages communicating, at exit ports thereof, with low pressure regions defined in said reservoir during operation of said pump motor, said second coolant passages serving to return coolant to said reservoir from said first coolant passages, said first and second coolant passages and said coolant reservoir defining a closed loop cooling system for said pump motor, wherein coolant is circulated through said first and second coolant passages and said coolant reservoir by means of a coolant circulation member.

31. The pump motor of claim 30, wherein said coolant circulation member includes a vortex impeller disposed in said coolant reservoir and operatively associated with said motor driveshaft.

32. The pump motor of claim 30, wherein said hosing member further includes a header passage which interconnects said first and second coolant passages together and said header passage is integrally formed entirely within said housing member sidewall portion.

33. The pump motor of claim 30, wherein said first coolant passage communicates with said coolant reservoir at a location generally adjacent an inner surface of said housing member sidewall and said second coolant passage communicates with said coolant reservoir at a location generally adjacent said base member.

34. The pump motor of claim 30, wherein said first openings of said first and second coolant passages communicate with said coolant reservoir at different radial locations with respect to said driveshaft.

35. In a centrifugal pump assembly having a centrifugal pump and an electrical motor assembly, the pump having a volute casing defining an internal pumping chamber which contains a rotatable pump impeller, the motor assembly including a rotor and stator enclosed in a motor housing, the motor assembly being operatively connected to the pump impeller by a driveshaft extending from within the motor housing to within said pump casing, the improvement comprising: said motor housing including a one-piece shell member having a plurality of longitudinal passages integrally formed within a sidewall portion thereof between opposing interior and exterior surfaces thereof, said longitudinal passages extending within said shell member between a coolant reservoir disposed proximate to one end of said shell member and an upper portion of said motor assembly disposed in said motor housing proximate to an opposite end of said motor housing member, said passages including distinct coolant lift passages and coolant return passages, the coolant reservoir including a circulation impeller operatively connected to the drive shaft, said coolant lift passages communicating with said coolant reservoir at a high coolant pressure region thereof and said coolant return passages communicating with said coolant reservoir at a low coolant pressure region thereof, said coolant reservoir high and has pressure regions being formed by rotation of the circulation impeller during operation of said motor assembly.

36. A closed loop cooling system for a motor operated pump in which the pump has a pump impeller rotatably mounted within a pump casing, the cooling system comprising:

a motor assembly, a housing member surrounding the motor assembly, the housing member having a motor chamber and a coolant reservoir defined therein, said housing member having a circumferential sidewall portion, the sidewall portion having means forming a plurality of first and second passages extending proximate to said motor chamber, the coolant reservoir including means for pumping coolant first through said cooling system, the coolant circulation means creating, during operation of said pump, high and low pressure regions in said coolant reservoir, said first passages having entrance ports which communicate with said coolant reservoir at the high pressure regions thereof and said second passages having exit ports which communicate with said coolant reservoir at said low pressure regions thereof, said first and second passages being interconnected together, said housing member further including a cover member interposed between said coolant reservoir and said pump casing and defining a heat transfer surface between said housing member and said pump casing, the cover member having a vent passage extending between said pump casing and the atmosphere surrounding said housing member, whereby air accumulating in said pump casing during operation of said pump may be discharged through said vent passage.

37. A closed loop cooling system for a motor operated pump in which the pump has a pump impeller rotatably mounted within a pump casing, the cooling system comprising:

a motor assembly, a housing member surrounding the motor assembly, the housing member having a motor chamber and a coolant reservoir defined therein, said housing member having a circumferential sidewall portion, the sidewall portion having means forming a plurality of first and second passages extending proximate to said motor chamber, the coolant reservoir including means for circulating coolant through said cooling system, the coolant circulation means creating, during operation of said pump, high and low pressure regions in said coolant reservoir, said first passages having entrance ports which communicate with said coolant reservoir at the high pressure regions thereof and said second passages having exit ports which communicate with said coolant reservoir at said low pressure regions thereof, said first and second passages being interconnected opposite their respective entrance and exit ports, said first and second passages being integrally formed within said housing member sidewall portion and being spaced apart by intervening land portions, said housing member including a cover plate member interposed between said housing member and said pump casing, the cover plate member including at least one extension of said second passages, said extension being integrally formed within said cover plate member.

* * * * *